United States Patent [19]

Menju et al.

[11] 4,142,230
[45] Feb. 27, 1979

[54] SEALED DC POWER CONVERTING STATION

[75] Inventors: Shiniti Menju, Atsugi; Iwao Ohshima, Tokyo, both of Japan

[73] Assignee: Tokyo Shibaura Denki Kabushiki Kaisha, Kawasaki, Japan

[21] Appl. No.: 780,802

[22] Filed: Mar. 24, 1977

[51] Int. Cl.$^2$ .......................... H02M 7/00; H02J 3/36
[52] U.S. Cl. ...................................... 363/51; 307/150;
307/151; 361/332; 363/54; 363/141; 363/144
[58] Field of Search ...................... 363/51, 54, 57, 141,
363/144, 146; 307/85, 150, 151; 361/331, 332,
350; 174/99 B

[56] References Cited

U.S. PATENT DOCUMENTS

| 3,564,386 | 2/1971 | Leonard | 363/141 |
| 3,721,890 | 3/1973 | Ettinger et al. | 363/144 |

OTHER PUBLICATIONS

"50 MW Thyristor Controlled Power Converter" by R. A. Zielke; *IEEE Trans. On Industry App.*, vol. 1A-11, No. 3, pp. 263-266, May/Jun. 1975.

*Primary Examiner*—Gerald Goldberg

[57] ABSTRACT

A sealed DC power converting station is provided with a bus bar group disposed at the central portion of the station and first and second groups of sealed controlled semiconductor switching units disposed on the opposite sides of the bus bar group. The switching units are respectively connected to the bus bar group through disconnectable gas insulated connection ducts. The station further includes a sealed smoothing reactor connected in series with a DC transmission line and arrestors provided for respective gas insulated connection ducts.

7 Claims, 6 Drawing Figures

SEALED DC POWER CONVERTING STATION

BACKGROUND OF THE INVENTION

This invention relates to an AC-DC or DC-AC electric power converting station (hereinbelow called DC converting station) in a DC transmission system, and more particularly to sealed DC converting station in which each constructional unit or element is arranged so as to be conveniently maintained and inspected or exchanged in case of a fault.

Recently, a DC power transmitting system having many characteristic features superior to an AC power transmitting system has been put into practical use. In the DC power transmitting system, indoor-type, air-insulated and air-cooled controlled semiconductor switching elements, for example, thyristors, are utilized as one of the most important units of a power converting station, with the thyristors and the controlling units thereof being installed indoors in many instances. In the meantime, oil-cooled and oil-insulated-type thyristors have been developed and used commercially in accordance with the requirements for units having large capacities and operating at high voltages. However, units and elements in a DC converting station, such as thyristors, DC transformers, DC potential transformers, reactors, arresters, and disconnecting switches, are connected to each other through bus bars supported by insulators in the air or through bushings.

On the other hand, a compact power converting station sealed in an air tight manner and insulated with sulfur hexa-fluoride ($SF_6$) gas has been built for use as a converting station in an AC power transmitting system to overcome problems such as air pollution, public hazards, earthquakes and the lack of a sufficiently large site to accommodate the station. For many of the same reasons, $SF_6$ gas insulation is also strongly desired in DC converting stations for insulating the air-insulated parts of bushings and supporting insulators. Particularly, as to air pollution, since the DC flashover voltage (a) under contaminated conditions is lower than the AC flash over voltage (b) under similar contaminated condition, as shown in FIG. 1, the problem of air pollution determines that whether DC power transmission is practicable or not.

In the AC converting station, the constructional units or elements are arranged about circuit interrupters which are the most important elements for the station and need periodical inspection and maintenance. For this reason, the circuit interruptors are constructed to be compact. Likewise, in the DC converting station too, it is important to arrange units or elements by taking into consideration the location of the thyristors which are the most important units in this station, requiring periodic inspection and mantenance. In the DC converting station, since DC bus bars and AC three phase bus bars are used and since a plurality of thyristors are connected in series to obtain a high voltage, the arrangement or location of these bus bars and units are naturally different from that of the AC converting station.

SUMMARY OF THE INVENTION

Accordingly, a principle object of this invention is to provide a sealed DC electric power converting station in which constructional units or elements are connected through $SF_6$ gas insulated conduit-type bus bars, with each unit or element being arranged so that the thyristors can be maintained and inspected periodically or exchanged easily.

According to this invention, there is provided a sealed DC power converting station which comprises a bus bar group including at least one gas insulated conduit three phases AC bus bar, a gas insulated conduit first DC bus bar, and a second DC bus bar, said bus bar group being disposed at a central portion of said station; a first group of sealed controlled semiconductor switching units disposed on one side of said bus bar group and a second group of sealed controlled semiconductor switching units disposed on the other side of said bus bar group opposite said first group of switching units, said first and second group of switching units being conducted to said bus bar group through disconnectable gas insulated connection ducts; a sealed smoothing reactor adapted to be connected in series with a DC transmission line, said reactor being connected to said first DC bus bar through a disconnectable gas insulated connection duct; and, an arrestor provided for each of said gas insulated connection ducts.

BRIEF DESCRIPTION OF THE DRAWINGS

This and other objects of the invention will become apparent by reference to the following detailed description taken in conjunction with the accompanying drawings, in which.

DESCRIPTION OF THE PREFERRED ENBODIMENT

Figure 1:
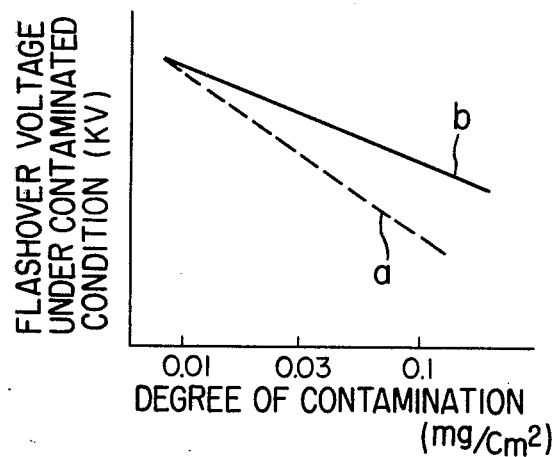
FIG. 1 shows a graph representing AC flash over voltage characteristics b under contaminated conditions and DC flash over voltage characteristics a under contaminated conditions.
Figure 2:
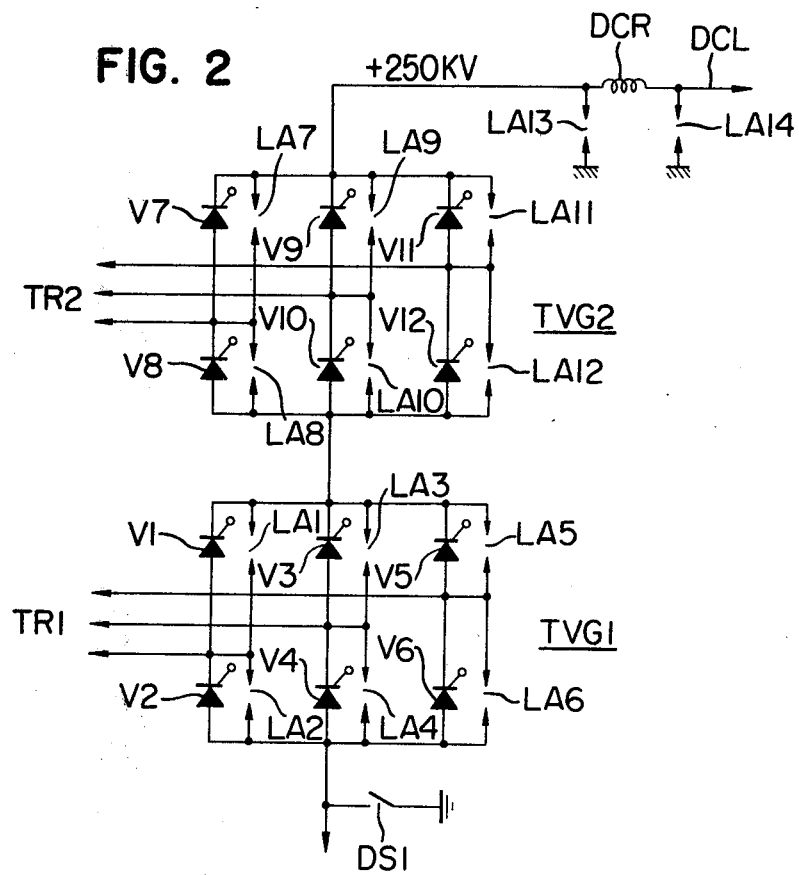
FIG. 2 shows a main circuit connection on the positive side of a DC converting station.

Referring now to the accompanying drawings, particularly to FIG. 2 showing the main circuit on the positive side of a typical DC power converting station, two thyristor converters TVG1 and TVG2 respectively energized by transformers TR1 and TR2, not shown, are connected in series. When the output of the power converting station is ±250 kV, ±125 kV is assigned for thyristor group TVG1 and ±125 kV for thyristor group TVG2. The thyristor groups TVG1 and TVG2 include respectively thyristors V1 through V6 and V7 through V12. There are also provided arresters LA1 through LA12 for protecting the thyristors V1 through V12, respectively, against overvoltage, and a smoothing reactor DCR, and arresters LA13 and LA14 respectively at the input and output ends of the reactor DCR. DCL designates a line for transmitting the output of +250 kV, and DS1 designates a disconnecting switch.

Regarding the negative side, the main circuit of the DC converting station is connected in the same manner as described above regarding the positive side except that the polarity of the thyristors is reversed.

Figure 3:
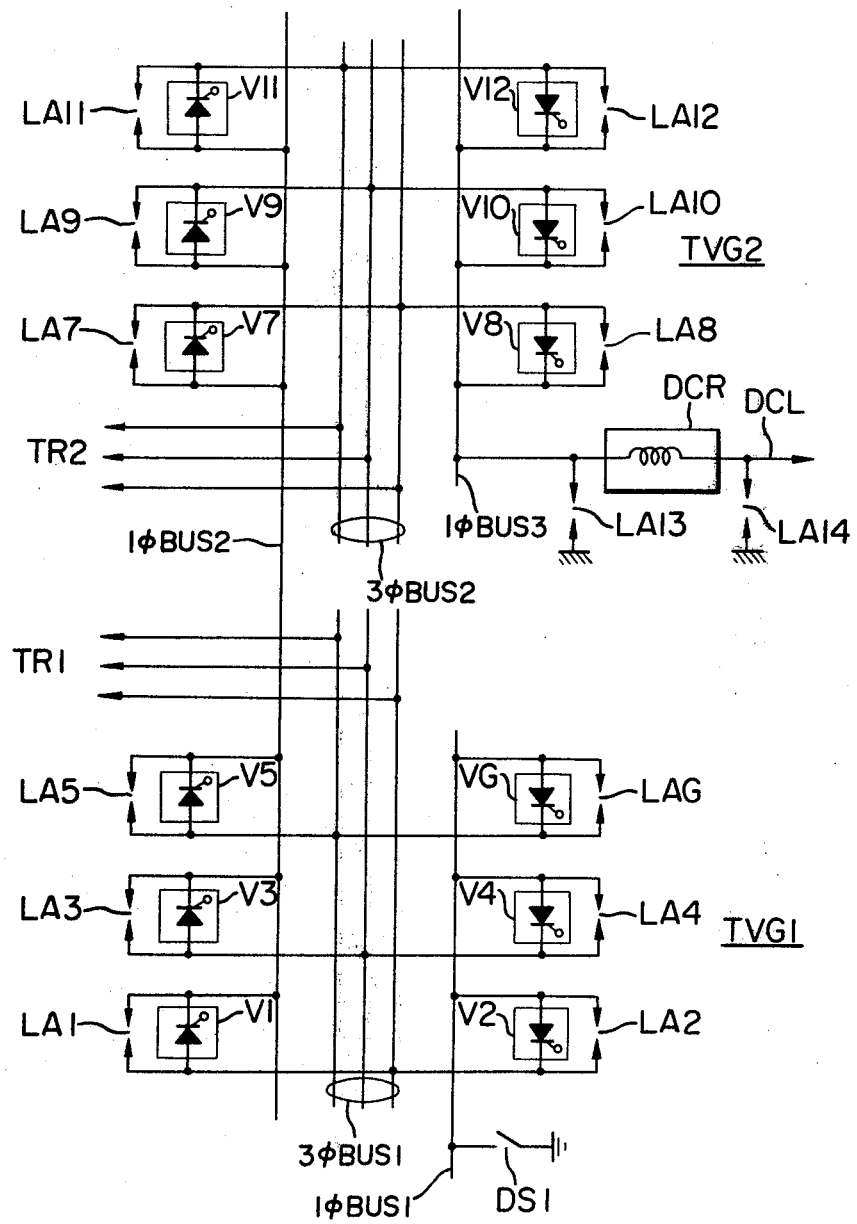
FIG. 3 is a circuit connection according to this invention which corresponds to FIG. 2.

FIG. 3 shows a circuit connection diagram of the units shown in FIG. 2 and connected according to this invention, in which three phase bus bars 3φ BUS1 and 3φ BUS2 connected respectively to the transformers TR1 and TR2 are shown and aligned in the central portion of the drawing. On both sides of the three phase bus bar 3φ BUS1 thyristors V1, V3, V5, and V2, V4, V6 of the thyristor group TVG1 are disposed and on both sides of the three phase bus bar 3φ BUS2 thyristors V7, V9, V11 and V8, V10, V12 of the thyristor group TVG2 are located. These three phase bus bars 3φ BUS1 and 3φ BUS2 are connected to a phase rotation bus bar, not shown, at two points thereby enabling easy connection of these three phase bus bars to the thyristors of both groups. A DC bus bar 1φ BUS1 on the positive side of the thyristor group TVG1, a DC bus bar 1φ BUS3 on the negative side of the thyristor group TVG2, and a DC bus bar 1φ BUS2 extending commonly on the negative side of TVG1 and on the positive side of TVG2 are all linearly arranged respectively along the three phase bus bar 3φ BUS1, along the three phase bus bar 3φ BUS2 and along the three phase bus bars 3φ BUS1 and 3φ BUS2. A DC power transmission line DCL is derived from the end of the DC bus bar 1φ BUS3 adjacent the thyristor group TVG2 through the smoothing reactor DCR, and the DC bus bar 1φ BUS1 is connected to the negative side of group TVG1 through the disconnecting switch DS1. LA1 through LA12, LA13 and LA14 are all arresters.

Figure 4:
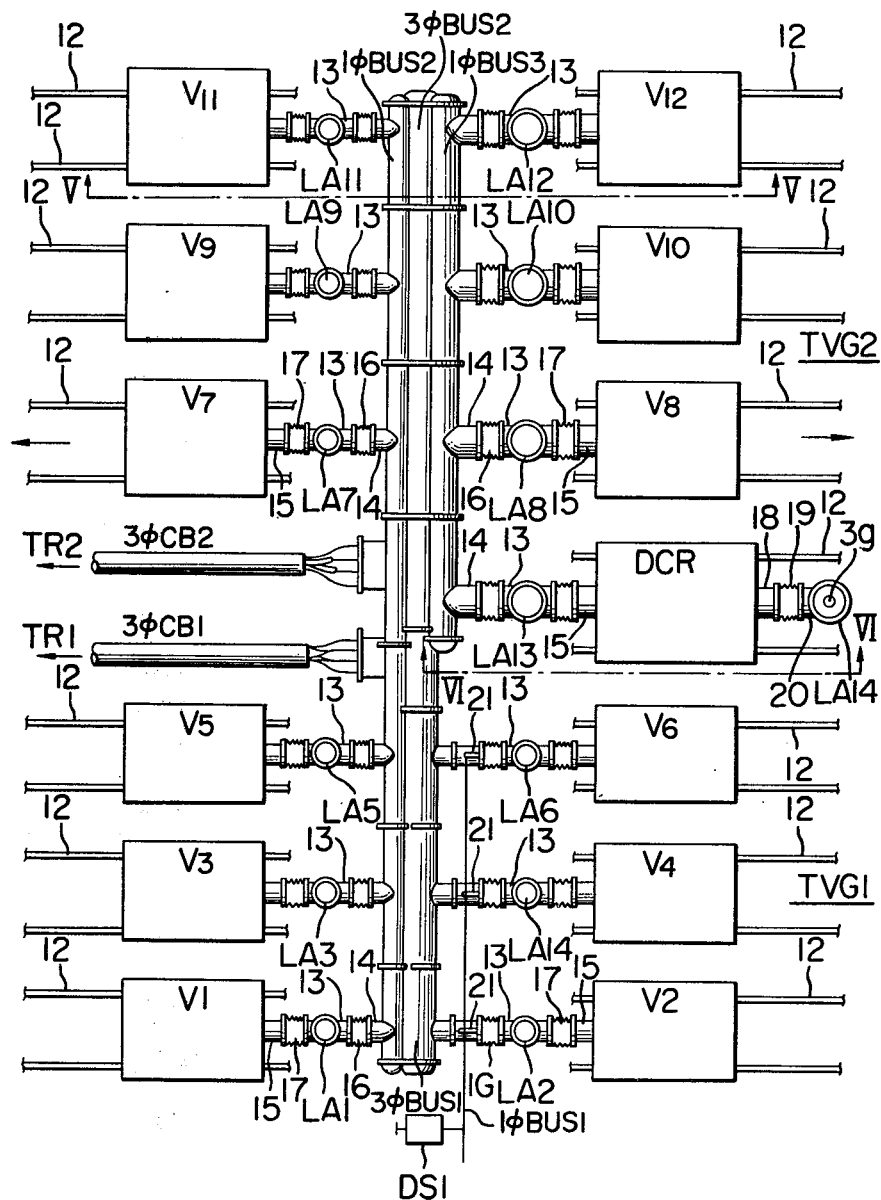
FIG. 4 shows a plan view of an arrangement of the units of the DC converting station according to this invention.
Figure 5:
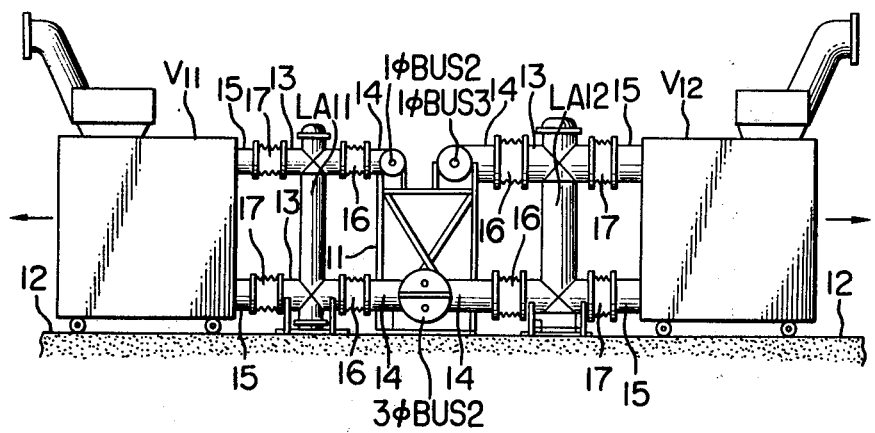
FIG. 5 is a view taken along the line V—V in FIG. 4.

A concrete connection of the converting station described above is shown in FIGS. 4, 5 and 6. Bus bars 3φ BUS1, 3φ BUS2, 1φ BUS2 and 1φ BUS3 are shown as SF$_6$ gas insulated conduit-type bus bars, which are supported by a supporting frame 11 substantially horizontally with respect to the ground. The bus bars 3φ BUS1 and 3φ BUS2 are disposed at the lower level and DC bus bars 1φ BUS2 and 1φ BUS3 are at the upper level. The bus bars 3φ BUS1 and 3φ BUS2 are not connected to each other electrically, but their ducts are communicated with each other. From the portion near the center of the ducts three phase cables 3φ CB1 and 3φ CB2 are fed out in an air-tightly manner for connection with the transformers TR1 and TR2 respectively. The DC bus bar 1φ BUS1 is insulated by air, as will be described in detail hereinbelow.

The thyristors V1 through V12 disposed on the both sides of the bus bars are formed as oil-insulated and oil-cooled sealed unit structures provided with wheels so that each unit may be movable on rails 12 laid on the ground. The smoothing reactor DCR is also formed as a sealed unit provided with wheels which can be moved on the rails 12.

Figure 6:
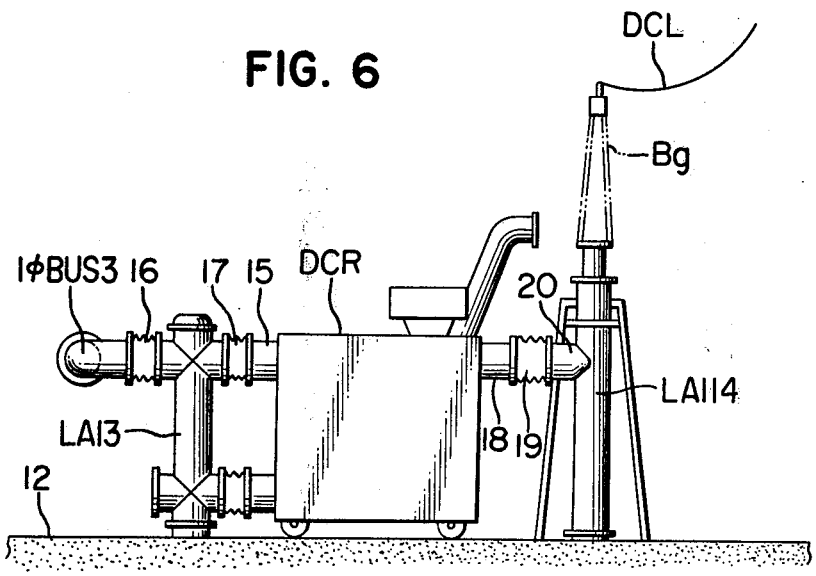
FIG. 6 is a view taken along the line VI—VI in FIG. 4.

The all conduit-type bus bars and the units of thyristors, as well as the smoothing reactor unit DCR are connected mutually by SF$_6$ gas insulated connection ducts 13, in a manner such that short branch ducts 14 and 15 are attached to the connecting parts of respective bus bars and the connecting surfaces of thyristor units V1 through V12 and the smoothing reactor DCR, respectively, and the connection ducts 13 are connected to these short branch ducts 14 and 15 through flexible pipes 16 and 17. As shown in FIG. 6, on the output side of the reactor DCR there is also provided a short branch duct 18 which is connected through flexible pipe 19 and connection duct 20 to a bushing Bg at the end of the power transmission line DCL. The protective arresters LA1 through LA12 are incorporated into the connection ducts 13 and 20 and sealed thereto. The units of the thyristors V1 through V12, the smoothing reactor DCR, and the arrestors LA1 through LA14 are separated from the conduit-type bus bars by interposing the flexible pipes 16, 17 and 19 therebetween. The DC bus bar 1φ BUS1 on the positive side of the thyristor group TVG1 is, as mentioned above, insulated by bushings 21 mounted on the connection ducts 13 of the thyristors V2, V4 and V6, and is connected to the disconnecting switch DS1 having a grounded terminal.

The power converting station provided with negative thyristors may also be built as a sealed type station as mentioned above.

Generally since the DC bus bar 1φ BUS1 is grounded through the disconnecting switch DS1, it is shown as being insulated by the atmosphere, but it may be formed as a sealed bus bar when the station is operated with the reverse polality. In such case, the DC bus bar 1φ BUS2 should be grounded through a switch. When either one of the thyristor groups TVG1 or TVG2, becomes inoperative, the power transmission may be made with one half the voltage of the rated voltage by short circuiting the faulty thyristor group. To this end, a sealed switch may be arranged between the bus bars 1φ BUS1 and 1φ BUS2 or between 1φ BUS2 and 1φ BUS3.

According to this invention, as is clear from the foregoing, three-phase AC bus bars and DC bus bars are located as gas insulated linear conduit-type bus bars, with sealed thyristor units disposed on both sides, i.e., positive and negative sides, of these bus bars, with the thyristor units being further separably connected to the bus bars through gas insulated connection ducts incorporating arresters, respectively. Therefore, the periodic inspection and maintenance of the thyristor units which are the most important units of a power converting station can easily be performed and in the case of a fault these units can easily be exchanged with spare thyristors. Furthermore, the transformers and one group of thyristor units are connected by one sealed-type three phase bus bar and two sealed-type DC bus bars, and one of these two DC bus bars can be commonly used in the case where a plurality of groups of the thyristor units are arranged, so that the space for installing the station can be drastically reduced.

It is to be understood by those skilled in the art that the foregoing description refers to a preferred embodiment of this invention and that various modifications and changes may be made without departing from the scope and spirit of the invention as defined in the appended claims.

We claim:
1. A sealed DC power converting station comprising:
a bus bar group including at least one gas insulated conduit three phase AC bus bar, a gas insulated conduit first DC bus bar, and a second DC bus bar, said bus bar group being disposed at a central portion of said station;
a first group of sealed controlled semiconductor switching units disposed on one side of said bus bar group and a second group of sealed controlled semiconductor switching units disposed on the other side of said bus bar group opposite said first group of switching units, said first and second group of switching units being connected to said bus bar group through disconnectable gas insulated connection ducts;
a sealed smoothing reactor adapted to be connected in series with a DC transmission line, said reactor being connected to said first DC bus bar through a disconnectable gas insulated connection duct; and,
an arrestor provided for each of said gas insulated connection ducts.

2. A sealed DC power converting station according to claim 1, wherein a plurality of said first and second groups of controlled semiconductor switching units are connected in series to act as a high potential group and a low potential group, the gas insulated conduit bus bars of said high and low potential group are arranged in a line, and said first DC bus bar and said second DC bus bar are linearly arranged respectively for the low and high potential groups.

3. A sealed DC power converting station according to claim 1, wherein said first and second semiconductor switching units are provided with wheels and which further comprises a plurality of rails extending at right angles with respect to said bus bar group for engaging with said wheels to movably support said semiconductor switching units.

4. A sealed DC power converting station according to claim 1, wherein said second DC bus bar comprises a gas insulated conduit bus bar.

5. A sealed DC power converting station according to claim 1, wherein said second DC bus bar is insulated by air.

6. A sealed DC power converting station according to claim 1, wherein each gas insulated connection duct is connected to said at least one three phase AC bus bar through a flexible pipe, and which further comprises a frame extending between said first and second groups of said semiconductor switching units, and wherein said AC bus bars are located at the lower level of said frame and said first and second DC bus bars at the upper level of said frame.

7. A sealed DC power converting station as in claim 1 wherein two gas insulated conduit three phase AC bus bars are provided in said bus bar group.

* * * * *